United States Patent
Kashyap et al.

(10) Patent No.: US 11,494,490 B2
(45) Date of Patent: *Nov. 8, 2022

(54) ENDPOINT DETECTION AND RESPONSE UTILIZING MACHINE LEARNING

(71) Applicant: Cylance Inc., Irvine, CA (US)

(72) Inventors: Rahul Chander Kashyap, Foster City, CA (US); Vadim Dmitriyevich Kotov, Cupertino, CA (US); Samuel John Oswald, Portland, OR (US); Homer Valentine Strong, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/882,309

(22) Filed: May 22, 2020

(65) Prior Publication Data

US 2020/0285741 A1 Sep. 10, 2020

Related U.S. Application Data

(63) Continuation of application No. 15/862,067, filed on Jan. 4, 2018, now Pat. No. 10,699,012.
(Continued)

(51) Int. Cl.
*G06F 21/56* (2013.01)
*G06N 20/00* (2019.01)
(Continued)

(52) U.S. Cl.
CPC ............ *G06F 21/561* (2013.01); *G06F 21/53* (2013.01); *G06F 21/56* (2013.01); *G06N 20/00* (2019.01);
(Continued)

(58) Field of Classification Search
CPC ........ G06F 21/53; G06F 21/56; G06F 21/561; G06N 20/00; H04L 63/1408
See application file for complete search history.

(56) References Cited

U.S. PATENT DOCUMENTS

| 5,978,475 A | 11/1999 | Schneier et al. |
| 6,678,679 B1 | 1/2004 | Bradford et al. |

(Continued)

FOREIGN PATENT DOCUMENTS

| EP | 2667337 A2 | 11/2013 |
| WO | 2007/011403 A3 | 6/2007 |

(Continued)

OTHER PUBLICATIONS

Non-Final Office Action issued for U.S. Appl. No. 15/354,966, dated Jul. 5, 2018 (23 pages).
(Continued)

*Primary Examiner* — Olugbenga O Idowu
(74) *Attorney, Agent, or Firm* — Jones Day

(57) ABSTRACT

A plurality of events associated with each of a plurality of computing nodes that form part of a network topology are monitored. The network topology includes antivirus tools to detect malicious software prior to it accessing one of the computing nodes. Thereafter, it is determined that, using at least one machine learning model, at least one of the events is indicative of malicious activity that has circumvented or bypassed the antivirus tools. Data is then provided that characterizes the determination. Related apparatus, systems, techniques and articles are also described.

20 Claims, 3 Drawing Sheets

Related U.S. Application Data

(60) Provisional application No. 62/445,172, filed on Jan. 11, 2017.

(51) Int. Cl.
*H04L 9/40* (2022.01)
*G06F 21/53* (2013.01)
*G06N 3/00* (2006.01)

(52) U.S. Cl.
CPC .......... *H04L 63/1408* (2013.01); *G06N 3/006* (2013.01)

(56) References Cited

U.S. PATENT DOCUMENTS

| | | | |
|---|---|---|---|
| 6,967,612 B1 | 11/2005 | Gorman et al. | |
| 7,219,090 B2 | 5/2007 | Travis, Jr. et al. | |
| 9,516,053 B1* | 12/2016 | Muddu | G06F 3/04842 |
| 10,015,015 B1 | 7/2018 | Lazar et al. | |
| 10,432,652 B1* | 10/2019 | Yona | H04L 63/1416 |
| 2007/0033273 A1 | 2/2007 | White et al. | |
| 2009/0089592 A1 | 4/2009 | Yasuhiro et al. | |
| 2012/0278341 A1 | 11/2012 | Ogilvy et al. | |
| 2013/0185022 A1 | 7/2013 | Maehata et al. | |
| 2014/0114942 A1 | 4/2014 | Belakovskiy et al. | |
| 2014/0143869 A1 | 5/2014 | Pereira et al. | |
| 2014/0189776 A1 | 7/2014 | Diehl | |
| 2014/0215621 A1 | 7/2014 | Xaypanya et al. | |
| 2014/0324352 A1* | 10/2014 | Hamann | G01W 1/10 702/3 |
| 2014/0344264 A1 | 11/2014 | Kenna et al. | |
| 2014/0365725 A1 | 12/2014 | Barrell et al. | |
| 2015/0142732 A1 | 5/2015 | Pace et al. | |
| 2015/0163121 A1 | 6/2015 | Mahaffey et al. | |
| 2015/0188715 A1 | 7/2015 | Castellucci et al. | |
| 2016/0080397 A1 | 3/2016 | Bacastow et al. | |
| 2016/0117470 A1 | 4/2016 | Welsh et al. | |
| 2016/0127417 A1 | 5/2016 | Janssen | |
| 2016/0330180 A1 | 11/2016 | Egorov et al. | |
| 2016/0373944 A1 | 12/2016 | Jain et al. | |
| 2017/0063908 A1 | 3/2017 | Muddu et al. | |
| 2017/0134397 A1 | 5/2017 | Dennison et al. | |
| 2017/0249461 A1 | 8/2017 | Permeh et al. | |
| 2017/0249462 A1 | 8/2017 | Permeh et al. | |
| 2018/0191766 A1 | 7/2018 | Holeman et al. | |
| 2018/0316691 A1 | 11/2018 | Strong et al. | |
| 2018/0316708 A1 | 11/2018 | Strong et al. | |

FOREIGN PATENT DOCUMENTS

| | | |
|---|---|---|
| WO | 2016/109005 A2 | 7/2016 |
| WO | 2017/147300 A1 | 8/2017 |
| WO | 2018/132425 A1 | 7/2018 |
| WO | 2018/200451 A1 | 11/2018 |
| WO | 2018/200458 A1 | 11/2018 |

OTHER PUBLICATIONS

Non-Final Office Action issued for U.S. Appl. No. 15/354,966, dated Apr. 14, 2017 (15 pages).
Non-Final Office Action issued for U.S. Appl. No. 15/354,966, dated Jan. 26, 2018 (21 pages).
Non-Final Office Action issued for U.S. Appl. No. 15/356,029, dated Jul. 6, 2018 (15 pages).
Non-Final Office Action issued for U.S. Appl. No. 16/426,997, dated Oct. 7, 2020 (20 pages).
Non-Final Office Action issued for U.S. Appl. No. 16/426,997, dated Mar. 8, 2021 (22 pages).
Non-Final Office Action issued for U.S. Appl. No. 16/425,479, dated Oct. 7, 2020 (15 pages).
Final Office Action issued for U.S. Appl. No. 16/425,479, dated Feb. 22, 2021 (18 pages).
Tjoa et al., "Towards more trustable log files for digital forensics by means of trusted computing". 2010 24th IEEE International Conference on Advanced Information Networking and Applications. IEEE, (2010) 1020-1027.
Non-Final Office Action issued for U.S. Appl. No. 15/961,685 dated Oct. 28, 2020 (15 pages).
Non-Final Office Action issued for U.S. Appl. No. 15/961,685 dated Jul. 2, 2020 (22 pages).
Final Office Action issued for U.S. Appl. No. 15/961,685 dated Aug. 12, 2020 (25 pages).
Non-Final Office Action issued for U.S. Appl. No. 15/961,659, dated Jun. 11, 2020 (19 pages).
Communication pursuant to Article 94(3) EPC Communication issued for EP Application No. 17709546.0, dated Dec. 18, 2020 (9 pages).
Communication pursuant to Article 94(3) EPC Communication issued for EP Application No. 17709546.0, dated Jun. 17, 2020 (7 pages).
Jain et al., "Using Bloom Filters to Refine Web Search Results," Eighth International Workshop on the Web and Databases (WebDB 2005), (2005).
Communication pursuant to Article 94(3) EPC Communication issued for EP Application No. 18724051.0 dated Jun. 11, 2021 (5 pages).
Hodo et al., "Shallow and Deep Networks Intrusion Detection System: A Taxonomy and Survey," Jan. 9, 2017 (Jan. 9, 2017), Retrieved from the Internet: URL: https://arxiv.org/ftp/arxiv/papers/1701/1701.02145.pdf [retrieved on Mar. 13, 2018].
Mishra et al., "Intrusion detection techniques in cloud environment: A survey," Journal of Network and Computer Applications 77:18-47 (2016).
Mohan et al., "Complex Event Processing Based Hybrid Intrusion Detection System," 2015 3rd International Conference on Signal Processing, Communication and Networking (ICSCN), IEEE, Mar. 26, 2015 (Mar. 26, 2015), pp. 1-6, [retrieved on Mar. 13, 2018].
Patcha et al., "An overview of anomaly detection techniques: Existing solutions and latest technological trends," Computer Networks 51(12):3448-3470 (2007).
Patent Cooperation Treaty International Search Report for International Application No. PCT/US2018/013093, dated Mar. 26, 2018 (4 pages).
Patent Cooperation Treaty International Search Report for International Application No. PCT/US2018/029051, dated Jul. 11, 2018 (5 pages).
Patent Cooperation Treaty Written Opinion of the International Searching Authority for International Application No. PCT/US2018/013093, dated Mar. 26, 2018 (6 pages).
Patent Cooperation Treaty Written Opinion of the International Searching Authority for International Application No. PCT/US2018/029051, dated Jul. 11, 2018 (10 pages).
Vasudeo et al., "IMMIX-intrusion detection and prevention system," 2015 International Conference on Smart Technologies and Management for Computing, Communication, Controls, Energy and Materials (ICSTM), IEEE, May 6, 2015 (May 6, 2015), pp. 96-101, [retrieved on Aug. 26, 2015].
Angelini et al., "An Attack Graph-based On-line Multi-Step Atack Detector," Proceedings of the 19th International Conference on Distributed Computing and Netoworking, Association for Computing Machinery, Jan. 4-7, 2018, pp. 1-10.
Patent Cooperation Treaty, International Search Report for for International Application PCT/US2018/029041, dated Jun. 13, 2018 (5 pages).
Patent Cooperation Treaty, Written Opinion of the International Searching Authority for International Application PCT/US2018/029041, dated Jun. 13, 2018 (10 pages).
Patent Cooperation Treaty, International Search Report for for International Application PCT/US2017/019142, dated Jul. 7, 2017 (6 pages).
Patent Cooperation Treaty, Written Opinion of the International Searching Authority for International Application PCT/US2017/019142, dated Jul. 7, 2017 (9 pages).

(56) References Cited

OTHER PUBLICATIONS

Schneier et al., "Secure Audit Logs to Support Computer Forensics," ACM Transactions on Information and System Security, 2(2):159-176 (1999).
Non-Final Office Action issued for U.S. Appl. No. 15/862,067, dated Feb. 19, 2020 (13 pages).
Non-Final Office Action issued for U.S. Appl. No. 15/862,067, dated Jul. 9, 2019 (10 pages).
Final Office Action issued for U.S. Appl. No. 15/862,067, dated Sep. 3, 2019 (12 pages).
Non-Final Office Action issued on U.S. Appl. No. 17/029,556, dated Feb. 17, 2022.
Communication pursuant to Article 94(3) EPC Communication issued for EP Application No. 18723311.9 dated Nov. 16, 2021 (5 pages).
Final Office Action dated May 10, 2022 for U.S. Appl. No. 17/029,996, filed Sep. 23, 2020.

\* cited by examiner

ENDPOINT DETECTION AND RESPONSE UTILIZING MACHINE LEARNING

RELATED APPLICATION

The current application claims priority to U.S. patent application Ser. No. 15/862,067 filed on Jan. 4, 2018 which, in turn, claims priority to U.S. Pat. App. Ser. No. 62/445,172 filed Jan. 11, 2017, the contents of both of which are hereby fully incorporated by reference.

TECHNICAL FIELD

The subject matter described herein relates to the use of machine learning in connection with endpoint detection and response.

BACKGROUND

Antivirus tools including software and hardware solutions are becoming increasingly effective at preventing malware from infecting individual computers as well as enterprise computing topologies. However, such antivirus tools are not foolproof thereby making such computers and enterprise computing topologies susceptible to malicious activity. To counter such malicious activities, endpoint detection and response (EDR) systems have been employed to identify suspicious activities as well as contain and remediate identified threats to reduce the likelihood of sensitive data loss.

SUMMARY

In a first aspect, a plurality of events associated with each of a plurality of computing nodes that form part of a network topology are monitored. The network topology includes antivirus tools to detect malicious software prior to it accessing one of the computing nodes. Thereafter, it is determined that, using at least one machine learning model, at least one of the events is indicative of malicious activity that has circumvented or bypassed the antivirus tools. Data is then provided that characterizes the determination.

Providing data characterizing the determination can include at least one of: display the data in an electronic visual display, loading the data into memory, storing the data in physical persistence, or transmitting the data to a remote computing device.

The providing data can include an identification of a source of the malicious activity. Based on the identification of the source of the malicious activity, a node corresponding to the identified source of the malicious activity can be isolated from communication with other nodes. In addition or in the alternative, in response to the identification of the source of the malicious activity, remediation can be initiated at the corresponding node to prevent further damage to the node and/or the network topology. In some variations, the remediation utilizes at least one reinforcement learning method selected from a group consisting of: multi-armed bandits, Q-learning, or Bayesian optimization.

The antivirus tools can include antivirus software and/or at least one computer network gateway appliance.

The machine learning models can be one or more of generalized linear models, ordinary least squares, ridge regression, lasso, multi-task lasso, elastic net, multi-task elastic net, least angle regression, LARS lasso, orthogonal matching pursuit (OMP), Bayesian regression, naive Bayesian, logistic regression, stochastic gradient descent (SGD), neural networks, Perceptron, passive aggressive algorithms, robustness regression, Huber regression, polynomial regression, linear and quadratic discriminant analysis, kernel ridge regression, support vector machines, stochastic gradient descent, nearest neighbor, Gaussian processes, cross decomposition, decision trees, or ensemble methods.

At least one of the machine learning models can use supervised learning. Such models can have labels originating from one or more of: existing label corpuses associated with executable files, indicators of compromise, or deterministic finite automata tailored to recognize particular tactics, techniques and procedures (TTPs).

At least one of the machine learning models can additionally or alternatively use unsupervised learning methods that characterize qualitative changes on a node based on corresponding monitored events. Such methods can include, for example, one or more of clustering, anomaly detection or latent variable models.

The machine learning models can be embodied in a plurality of machine learning packs. Each machine learning pack can be separate and distinct and identify different types of malicious activity. For example, the different types of malicious activity identified by the machine learning packs can include memory-based attacks, POWERSHELL/macro-based exploits, privilege escalation, lateral movement, data exfiltration, anti-analysis efforts, password stealer, backdoor/tunnel, and/or insider threat.

At least one of the machine learning packs can be self-configured dynamically on a corresponding node based on communications with another node and/or a remote computing system. Similarly, at least one of the machine learning packs on a corresponding node can be updated based on communications with another node and/or a remote computing system. Further, at least one machine learning model can be dynamically updated based on the monitored events.

In some cases, missing data can be imputed using at least one generative model. Such missing data can provide context for at least one event indicative of the malicious activity.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques to earlier and more effectively identify threats which, in turn, allow for more rapid remediation and containment of such threats. More rapid remediation and contained can greatly reduce the likelihood and/or amount of sensitive data loss within an enterprise computing topology.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
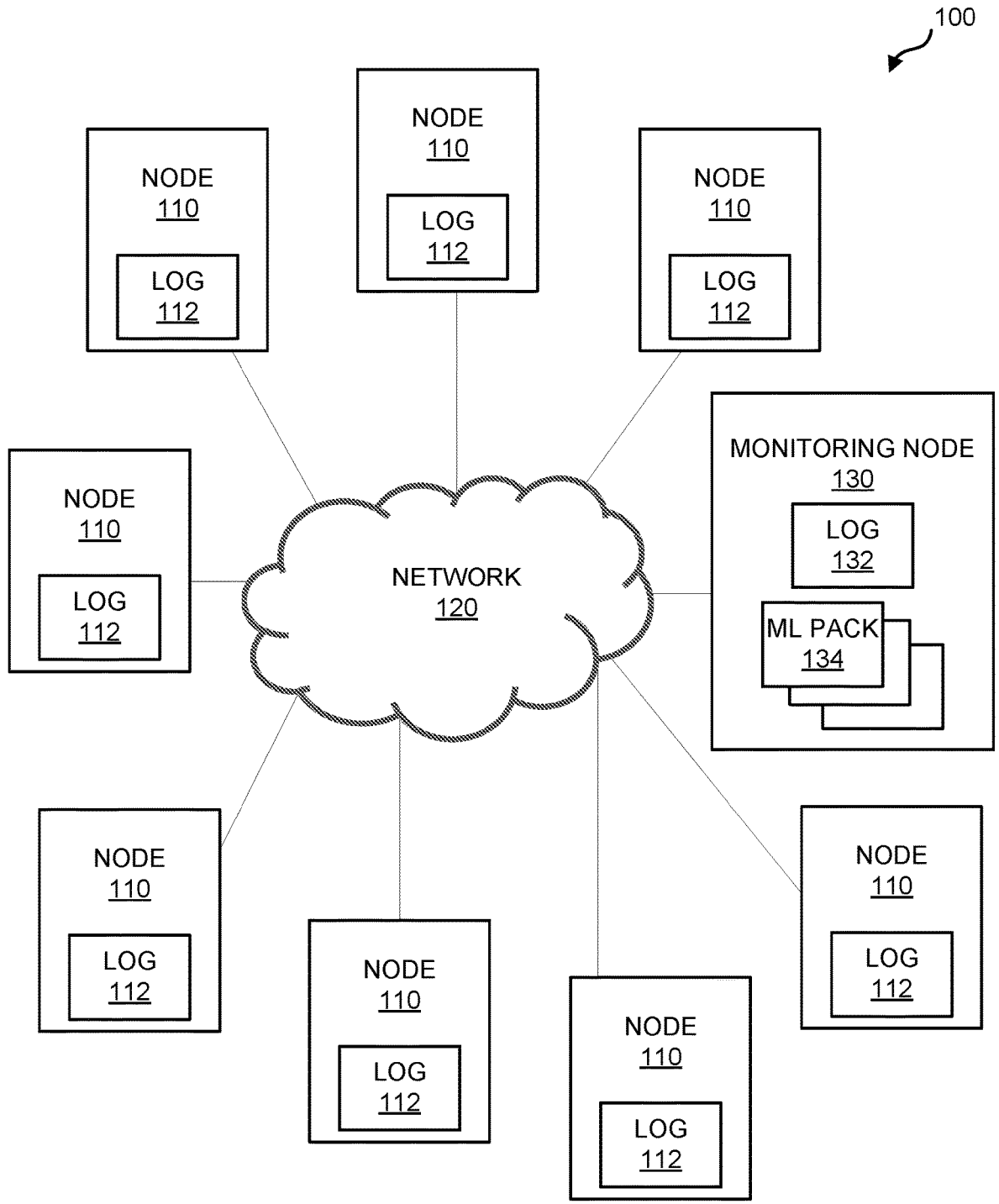
FIG. 1 is a diagram illustrating a simplified network topology.

The current subject matter is directed to an endpoint detection and response (EDR) system that utilizes machine learning to more rapidly and precisely identify threats within a network topology. FIG. 1 is a simplified diagram of a network topology 100 (which may correspond to an enterprise computer topology) in which there are a plurality of computing nodes 110 (sometimes also referred to as endpoints) which communicate with each other via a network 120 (e.g., the Internet, a WAN, a LAN, etc.) and/or in a peer-to-peer fashion. These nodes 110 can also have access to remote computing systems and networks (not illustrated) via the network 120 or by other means. The nodes 110 can be any form of computing device including, for example, mobile phones, laptop computers, desktop computers, and servers.

Events associated with each of the computing nodes 110 can be monitored either locally by such nodes 110 and/or centrally by one of a monitoring node 130. Certain, or all of such events, can be logged or otherwise made available for later analysis or retrieval. The event data, for example, can be multi-dimensional and stored in one or more tables in a database system or other data storage device. The determination of whether monitored events are to be logged can be based, for example, on a static rule set being executed by a rules engine, one or more machine learning models, or a combination of both. For example, the static rule set can be used to filter out certain events for later analysis using a machine learning model or vice versa. In some cases, software hooks or other event handlers are used to monitor operating system and/or other application events on each node 110. Alternatively, software hooks or other data interception techniques can be used to monitor packet traffic to and/or from the various nodes 110.

In some variations, some or all of the nodes 110 can include a local log 112 in which data characterizing the monitored events are stored. In other variations, the nodes 110 periodically or upon some triggering event (i.e., demand, etc.) transmit data characterizing various monitored events to the monitoring node 130 for storage in a central log 132. Whether or not the local logs 112 form part of the network topology, a central log 132 can be used, or if no logs are used at all, the monitoring node 130 (which in turn can comprise distributed computing devices), can apply some or all of the data obtained as part of the monitoring to one or more machine learning model packages 134 (referred to herein as ML packs 134). Techniques for harvesting events and storing them in logs can be found in commonly owned U.S. patent application Ser. No. 15/354,966 filed on Nov. 17, 2016 and U.S. Pat. App. Ser. No. 62/300,621 filed on Feb. 26, 2016, the contents of both of which are hereby fully incorporated by reference.

The events can take many forms. In one example, the events characterizes operations/processes that lead up to detection of malware on a node 110 by an antivirus tool such as file/data source, associated IP address, user identification, time of day, and the like.

The events can enumerate profiles and rules for firewalls, including Windows Firewall forming part of the network topology 100.

The events can specify start times, associated users and processes, executables being utilized by the nodes 110, and the like.

The events can characterize various aspects of the network 120 including, without limitation, ARP, DNS requests, URLs for a downloaded file, IP connects, Wi-Fi radios and access points, Bluetooth radios and devices, modifications to HOSTS file, and the like. The network 120 related data can correlate URLs to IPs, and network activity to running processes. In addition, the network 120 related data can captures information about network cards and static/dynamic routes.

The events can characterizes files used by one of the nodes 110 or otherwise transported across the network 120 including, for example, create, modify, delete, and renamed events along with metadata and file attributes. Such event data can be used to correlate file to process relationships.

The events can comprise registry related information of one or more of the nodes 110 including, for example, create, modify, and/or delete events for registry keys and values. In some variations, the events can identify more than one hundred persistence points/locations that are used by malware to persist after system reboot. The registry event information can correlates registry keys/values with the process that created them. In addition, the registration event information can correlates persistent registry key/value with the file that is trying to persist through a specialized parser.

The events can also characterize removable media insertion events at one of the nodes 110 along with files being copied to/from and executed. In particular, the events can identify whether the malware detected at a particular node 110 originated from removable media. The removable media events can also be used to identify source code files and documents being copied to removable media.

The events can also characterize various processes being executed at one or more of the nodes 110. As an example, the event data can characterize create, delete, suspend, load, and modify events for processes, threads, and modules. Such event can data can be used to correlate processes with originating files, created/modified/deleted files, registry, network activity, and the like. Event data can also focuses on resolving Remote Thread Creation where existing processes have threads injected into them. The event data can identify DLL injection through Remote Thread Creation of kernel32!LoadLibraryA/W.

The event data can also be characterizes users. For example, the event data can specify previously logged on users. It can also associate users with actions, including create/modify/delete events. The event data can further identify anonymous logins, network logins, off-hour logins, and failed logins. Moreover, the user event data can be used to correlate users with malicious/suspicious activity.

Further, the event data can provide various device-related information. For example, the event data can provide a complete view of the system, including the operating system, installed applications, BIOS, hardware, computer manufacturer, and languages. Device related data can also enumerate loaded drivers and registered services.

In some variations, the ML packs 134 can selectively filter or aggregate events to reduce downstream resource consumption. For example, an ML pack 134 can determine with high confidence that a particular process currently running is trusted and thus disregard events associated with that process. When many similar low-interest events are present, an ML pack 134 can summarize them to reduce resource overhead.

The ML packs 134 can be used individually (i.e., they can be separate and distinct, etc.) or as part of an ensemble of machine learning models to identify multi-dimensional Tactics, Techniques, and Procedures (TTPs) being employed to breach the network topology 100. Different ML packs 134 can identify different types of threats. The ML packs 134 can specifically identify which nodes 110 are likely to have been compromised in some fashion, how such nodes 110 have been compromised, and optionally, the ML packs 134 can be used to initiate appropriate remediation responses.

In some variations, there are a library of available ML packs 134 from which specific ML packs 134 can be selected and implemented as part of the EDR system and/or for use by the monitoring device 130. In some cases, a software tool can provide such recommendations (either by automatically exploring the network topology 100 and characterizing same or by receiving data characterizing the network topology 100). In other variations, there can be segment-specific ML packs 134 (i.e., medical device ML packs, etc.) that can be manually selected and implemented.

The ML packs 134 can incorporate one or more machine learning models and in some cases, can be binary or multi-class classifiers in that they output values indicating whether the event data indicates that an associated activity is likely to be malicious, likely to be malicious or otherwise unauthorized (other classifications can be employed). In some cases, the ML packs 134 can be utilized in parallel or in sequence. With the latter arrangement, if the ML packs 134 indicate that a certain situation may be present, the event data or a modification thereof can be passed to an additional ML pack 134 (e.g., a more computationally expensive ML pack 134).

The ML packs 134 can be configured dynamically on nodes 110 (i.e., endpoints, etc.) based on communication with other computers, either to a central server or to other nodes 110 (i.e., endpoints, etc.). This communication allows nodes 110 to communicate with another regarding observed anomalies or updates to model parameters. For example, if a threat is detected on a node 110, the ML pack 134 can update its parameters and then propagate the parameters changes to other nodes 110. Changes to model parameters can represent, for example, one or more of likelihood gradients, posterior parameter samples, or very informative observations. ML packs 134 can also dynamically self-configure for the purposes of experimental design, to optimize information available in pooled data.

The ML packs 134 can, in some variations, utilize one or more supervised learning models in which the models are trained using data sets with known outcomes. Sample supervised machine learning models that can be used by the ML packs 134 include, for example, generalized linear models such as ordinary least squares, ridge regression, lasso, multi-task lasso, elastic net, multi-task elastic net, least angle regression, LARS lasso, orthogonal matching pursuit (OMP), Bayesian regression, naive Bayesian, logistic regression, stochastic gradient descent (SGD), neural networks, Perceptron, passive aggressive algorithms, robustness regression, Huber regression, and/or polynomial regression. Other sample supervised machine learning models that can be used by the ML packs 134 include linear and quadratic discriminant analysis, kernel ridge regression, support vector machines, stochastic gradient descent, nearest neighbor, Gaussian processes, cross decomposition, decision trees, and/or ensemble methods. The ML packs 134 can additionally, or alternatively, employ semi-supervised learning models and/or machine learning models requiring active learning.

Labels for supervised learning by the ML packs 134 can originate from a variety of sources, including but not limited to: existing label corpuses associated with executable files, indicators of compromise, or deterministic finite automata tailored to recognize particular TTPs. Labels associated with files or processes can be transferred to association with individual events using techniques such as multi-instance learning. Once trained, ML packs 134 need not be static, but may, in some implementations, continue to be updated.

Unsupervised methods, such as clustering, anomaly detection, or latent variable models can additionally or alternatively be used by ML packs 134 for anomaly detection or to trigger alerts and/or remediation. In these scenarios, no specific labels are needed to train the unsupervised models. Instead, the unsupervised models trigger alerts when they detect qualitative change in the event behavior on a node 110. For example, if a compromised node 110 historically has very regular filesystem activity but a malicious process begins to overwrite a large number of files, an ML pack 134 can recognize this activity as unusually suspicious although the training corpus may or may not contain a specific episode of similar behavior labelled appropriately.

ML packs 134 can employ generative models to impute missing data. In these variations, ML packs 134 can add to the existing context surrounding a detected attack. For example, if an attack involved a network connection to a known malicious IP address, but the port and protocol information had been discarded due to storage constraints, an ML pack 134 can infer the missing port and protocol information with high confidence.

When an attack is detected by an ML pack 134, remediation and alerting can be configured and/or automatically triggered. For example, if a process is suspected to be contacting a malicious command and control server, the alert raised by the ML pack 134 can trigger network isolation response on the corresponding node 110. In cases where the remediation is not configured, the ML packs 134 can perform automated remediation experiments, attempting several options until the attack has been successfully stopped. ML packs 134 can implement reinforcement learning methods such as multi-armed bandits, Q-learning, or Bayesian optimization to achieve successful remediation or data collection goals.

In addition to triggering alerts and/or remediation, ML packs 134 can provide output summarizing, highlighting, or explaining the suspicious behavior. This can, for example, take the form of an encoded diagram, a written description of the attack, or some other format that may be readily interpretable to a human analyst. For example, if a process is suspected of reconnaissance, the ML pack 134 can provide a description such as "process X is suspected of performing malicious reconnaissance due to unusual file scanning activity in the following directories: . . . ".

Memory-based attacks. One or more of the ML packs 134 can be configured to detect, from the collected events memory-based attacks that attempt to exploit a memory address space or otherwise corrupt memory in one of the nodes 110.

PowerShell/Macro based exploits. One or more ML packs 134 can be configured to detect Microsoft PowerShell and/or macro-based malware attempts that use social engineering to get an end user to open an attachment, which in turn, executes the macro causing the macro to download binary files to infect the corresponding node 110 and/or the network topology 100.

Privilege escalation. One or more ML packs 134 can be configured to detect situations in which, a bug, design flaw or configuration oversight is exploited in an operating system or software application being executed by one of the nodes 110 to gain elevated access to resources. The ML packs 134 can more earlier detect such situations to avoid an application/user performing actions more than originally authorized/intended.

Lateral movement. One or more ML packs 134 can be configured to detect when threat actors/malware are moving or about to move amongst the nodes 110. By earlier identifying attributes associated with lateral movement using the ML packs 134, the threat actors/malware can be earlier contained and remediated.

Data Exfiltration. One or more ML packs 134 can be configured to identify unauthorized copying, transfer or retrieval of data from one of the nodes 110 or a likelihood of one of these actions taking place. By earlier identifying attributes associated with data exfiltration, the amount of transferred data can be limited or altogether prevented.

Anti-Analysis. One or more ML packs 134 can be configured to detect the presence of anti-analysis processes/software at one of the nodes 110. Such anti-analysis processes/software, if not properly detected, can bypass various AV tools. For example, the ML packs 134 can be configured to detect anti-virtual machines that attempt to detect if the execution environment is a known VM or emulator, anti-debugging to attempt to detect if the program is running under the surveillance of a debugger, and/or anti-sandbox to attempt to detect known sandboxing products. Countermeasures can be implemented once the anti-analysis processes/software are identified using the ML packs 134.

Password Stealer. The ML packs 134 can be used to identify misappropriation of login credentials stored at the nodes 110 and to take appropriate measures to prevent such login credentials from being exfiltrated.

Backdoor/Tunnel. The ML packs 134 can also be used to identify that a backdoor/tunnel has been or will soon be established so that information can be exfiltrated. With earlier identification by the ML packs 134, the backdoors/tunnels can be plugged or otherwise blocked.

Insider Threats. The ML packs 134 can also be used to identify whether there any of the event data indicates that an insider (i.e., an authorized user of the node 110/system) is taking actions indicative of an insider threat. For example, the ML packs 134 can be used to identify aberrant behavior of a user (e.g., unusual data transfer, database table accesses, etc.) that is indicative of an insider threat.

Figure 2:
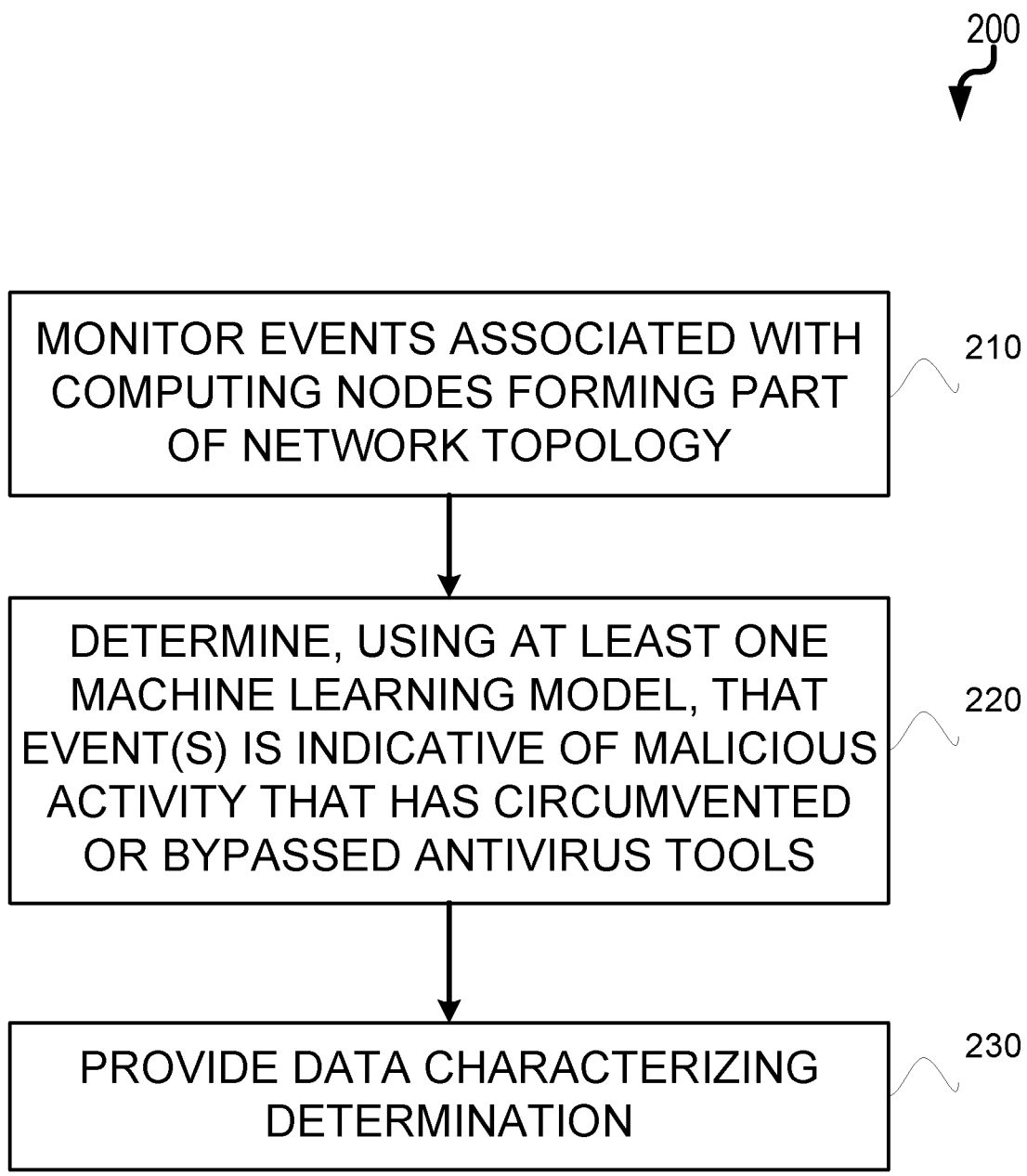
FIG. 2 is a process flow diagram illustrating endpoint detection and response using machine learning.

FIG. 2 is a process flow diagram 200 illustrating the use of machine learning in connection with endpoint discovery and response. Initially, at 210, a plurality of events are monitored that are associated with each of a plurality of computing nodes forming part of a network topology. The network topology includes antivirus tools (e.g., software, network gateway appliances, etc.) to detect malicious software prior to it accessing one of the computing nodes. It is later determined using one or more machine learning models, at 220, that at least one of the events is indicative of malicious activity that has circumvented or bypassed the antivirus tools. Data is then provided, at 230, that characterizes the determination. Provided, in this regard, can include displaying such data in an electronic visual display, transmitting the data to a remote computing system (to, for example, initiate containment and/or remediation, etc.), loading the data into memory, and/or storing the data into physical persistence.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 3:
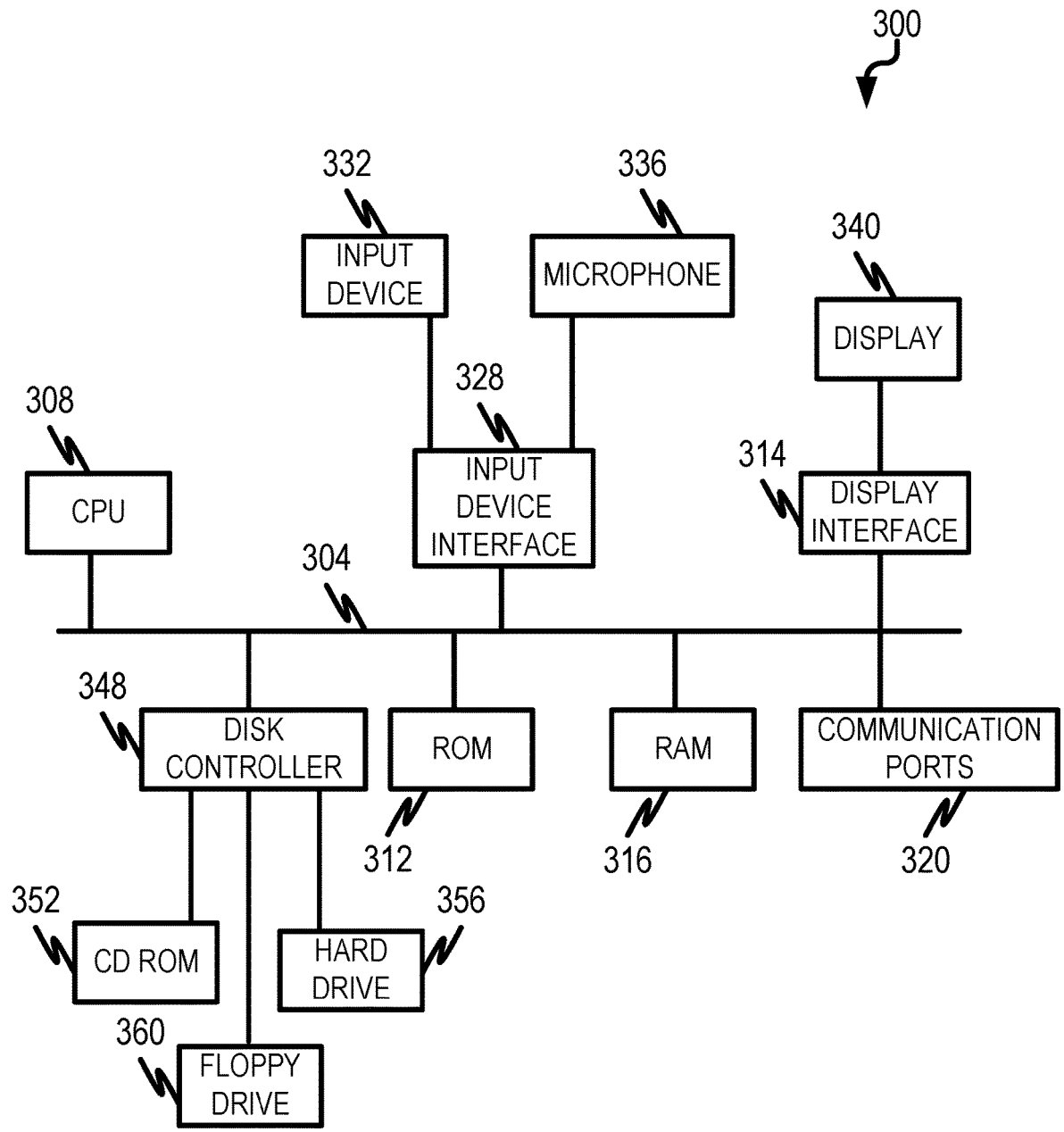
FIG. 3 is a diagram illustrating aspects of a node forming part of the simplified network topology.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. In the input device 332 and the microphone 336 can be coupled to and convey information via the bus 304 by way of an input device interface 328. Other computing devices, such as dedicated servers, can omit one or more of the display 340 and display interface 324, the input device 332, the microphone 336, and input device interface 328.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:
   monitoring, by at least one data processor, a plurality of events associated with each of a plurality of computing nodes forming part of a network topology, the network topology comprising antivirus tools to detect malicious software prior to it accessing one of the computing nodes;
   determining, by a least one data processor using a plurality of machine learning models, that at least one of the events is indicative of malicious activity that has circumvented or bypassed the antivirus tools, the plurality of machine learning models being embodied in a plurality of machine learning packs, each pack being separate and distinct and identifying different types of malicious activity; and
   providing, by at least one data processor, data characterizing the determination;
   wherein at least a portion of the machine learning packs are selected from a library of available machine learning packs in response to a software tool providing recommended machine learning pack selections after automatically exploring the network topology.

2. The method of claim 1, wherein providing data characterizing the determination includes at least one of: display the data in an electronic visual display, loading the data into memory, storing the data in physical persistence, or transmitting the data to a remote computing device.

3. The method of claim 1 further comprising:
   identifying, by at least one data processor, a source of the malicious activity;
   wherein the provided data further characterizes the identified source of the malicious activity.

4. The method of claim 3 further comprising:
   isolating a node corresponding to the identified source of the malicious activity from communication with other nodes.

5. The method of claim 3 further comprising:
   initiating remediation at the node corresponding to the identified source of the malicious activity to prevent further damage to the node and/or the network topology.

6. The method of claim 5, wherein the remediation utilizes at least one reinforcement learning method selected from a group consisting of: multi-armed bandits, Q-learning, or Bayesian optimization.

7. The method of claim 1, wherein the antivirus tools comprise at least one of: antivirus software or a computer network gateway appliance.

8. The method of claim 1, wherein the plurality of machine learning models are selected from a group consisting of: generalized linear models, ordinary least squares, ridge regression, lasso, multi-task lasso, elastic net, multi-task elastic net, least angle regression, LARS lasso, orthogonal matching pursuit (OMP), Bayesian regression, naive Bayesian, logistic regression, stochastic gradient descent (SGD), neural networks, Perceptron, passive aggressive algorithms, robustness regression, Huber regression, polynomial regression, linear and quadratic discriminant analysis, kernel ridge regression, support vector machines, stochastic gradient descent, nearest neighbor, Gaussian processes, cross decomposition, decision trees, or ensemble methods.

9. The method of claim 1, wherein at least one of the plurality of machine learning models uses supervised learning and has labels origination from a source selected from a group consisting of: existing label corpuses associated with executable files, indicators of compromise, or deterministic finite automata tailored to recognize particular tactics, techniques and procedures (TTPs).

10. The method of claim 1, wherein at least one of the plurality of machine learning models uses unsupervised learning methods that characterize qualitative changes on a node based on corresponding monitored events.

11. The method of claim 10, wherein the unsupervised learning methods are selected from a group consisting of: clustering, anomaly detection or latent variable models.

12. The method of claim 1, wherein different types of malicious activity identified by the machine learning packs are selected from a group consisting of: memory-based attacks, POWERSHELL/macro-based exploits, privilege escalation, lateral movement, data exfiltration, anti-analysis efforts, password stealer, backdoor/tunnel, or insider threat.

13. The method of claim 11, wherein at least one machine learning pack is self-configured dynamically on a corresponding node based on communications with at least one of: another node or a remote computing system.

14. The method of claim 11, wherein at least one machine learning pack on a corresponding node is updated based on communications with at least one of: another node or a remote computing system.

15. The method of claim 1, wherein at least one of the plurality of machine learning models is dynamically updated based on the monitored events.

16. The method of claim 1 further comprising:
imputing, using at least one generative model, missing data providing context of at least one event indicative of the malicious activity.

17. The method of claim 1 further comprising:
preventing the malicious software from continuing to execute.

18. A non-transitory computer program product storing instructions which, when executed by at least one data processor forming part of at least one computing device, implement operations comprising:
monitoring a plurality of events associated with each of a plurality of computing nodes forming part of a network topology, the network topology comprising antivirus tools to detect malicious software prior to it accessing one of the computing nodes;
determining, using a plurality of machine learning models, that at least one of the events is indicative of malicious activity that has circumvented or bypassed the antivirus tools, the plurality of machine learning models being embodied in a plurality of machine learning packs, each pack being separate and distinct and identifying different types of malicious activity; and
preventing, based on the determining, the malicious software from continuing to execute
wherein at least a portion of the machine learning packs are selected from a library of available machine learning packs in response to a software tool providing recommended machine learning pack selections after automatically exploring the network topology.

19. A system comprising:
at least one data processor; and
memory storing instructions which, when executed by the at least one data processor, implement operations comprising:
monitoring a plurality of events associated with each of the plurality of computing nodes forming part of a network topology, the network topology comprising antivirus tools to detect malicious software prior to it accessing one of the computing nodes;
determining, using at least one machine learning model, that at least one of the events is indicative of malicious activity that has circumvented or bypassed the antivirus tools; and
preventing, based on the determining, the malicious software from continuing to execute;
wherein at least a portion of the machine learning packs are selected from a library of available machine learning packs in response to a software tool providing recommended machine learning pack selections after automatically exploring the network topology.

20. The non-transitory computer program product of claim 18, wherein the operations further comprise:
deploying the machine learning packs in the network topology.

* * * * *